United States Patent
Szudajski et al.

(10) Patent No.: US 9,208,677 B2
(45) Date of Patent: Dec. 8, 2015

(54) SYSTEMS AND METHODS FOR PROCESS ALARM REDUCTION

(71) Applicant: General Electric Company, Schenectady, NY (US)

(72) Inventors: Thomas Giles Szudajski, Atlanta, GA (US); Paul Edward Cuddihy, Niskayuna, NY (US); Gopi Subramanian, Bangalore, IN (US)

(73) Assignee: General Electric Company, Schenectadt, NY (US)

( * ) Notice: Subject to any disclaimer, the term of this patent is extended or adjusted under 35 U.S.C. 154(b) by 201 days.

(21) Appl. No.: 13/911,608

(22) Filed: Jun. 6, 2013

(65) Prior Publication Data

US 2014/0361885 A1  Dec. 11, 2014

(51) Int. Cl.

| G08B 29/00 | (2006.01) |
|---|---|
| G08B 29/18 | (2006.01) |
| G05B 23/02 | (2006.01) |
| H04L 12/24 | (2006.01) |

(52) U.S. Cl.
CPC ............ *G08B 29/18* (2013.01); *G05B 23/0272* (2013.01); *H04L 41/0609* (2013.01); *H04L 41/0883* (2013.01)

(58) Field of Classification Search
CPC ............ G05B 23/0272; H04L 41/0883; H04L 41/0609
USPC .......................... 340/506, 507, 539.1, 539.11
See application file for complete search history.

(56) References Cited

U.S. PATENT DOCUMENTS

| 5,400,246 A * | 3/1995 | Wilson et al. .................. 700/17 |
|---|---|---|
| 6,492,901 B1 | 12/2002 | Ridolfo |
| 6,535,122 B1 | 3/2003 | Bristol |
| 7,183,905 B2 | 2/2007 | Neubauer et al. |
| 7,565,262 B2 | 7/2009 | Yuan et al. |
| 2002/0059078 A1 | 5/2002 | Valdes et al. |
| 2010/0211192 A1 | 8/2010 | Stluka et al. |
| 2011/0010654 A1 | 1/2011 | Raymond et al. |

OTHER PUBLICATIONS

European Search Report and Opinion issued in connection with corresponding EP Application No. 14170180.5 on Oct. 23, 2014.

* cited by examiner

*Primary Examiner* — Daryl Pope

(74) *Attorney, Agent, or Firm* — Sutherland Asbill & Brennan LLP

(57) ABSTRACT

Certain embodiments of the disclosure may include systems and methods for process alarm reduction. According to an example embodiment of the disclosure, a method is provided for process alarm reduction. The method can include generating at least one alarm event modality based at least in part on the received alarm information or alarm events; filtering the received alarm information or alarm events using the at least one alarm event modality; and prioritizing at least a portion of the filtered alarm information or alarm events.

18 Claims, 3 Drawing Sheets

SYSTEMS AND METHODS FOR PROCESS ALARM REDUCTION

TECHNICAL FIELD

Embodiments of the disclosure relate generally to management of process alarms and in particular to systems and methods for process alarm reduction.

BACKGROUND

When alarm management processes are designed and configured, alarms can be assigned to indicate the existence of particular circumstances. These circumstances may directly call for an adjustment or action to be made by an associated process controller or computer processor. However, due to the complexity of certain processes, a relatively large number of alarms may be generated for a respective process. Further, many of the alarms may be redundant or may otherwise inundate the process controller or computer processor with information that is not significant. Thus, alarm analysis and management by conventional process controllers and computer processors can be hindered by an excessive number of nuisance alarms.

BRIEF SUMMARY OF THE DISCLOSURE

Some or all of the above needs and/or problems may be addressed by certain embodiments of the disclosure. Certain embodiments of the disclosure can include systems and methods for process alarm reduction. According to an example embodiment of the disclosure, a method for reducing process alarms can be provided. The method can include: receiving alarm information or alarm events from one or more sensors, devices, or computing devices associated with a monitored system; generating at least one alarm event modality based at least in part on the received alarm information or alarm events; filtering the received alarm information or alarm events using the at least one alarm event modality; and prioritizing at least a portion of the filtered alarm information or alarm events.

According to another example embodiment, a system can be provided to reduce process alarms. The system can include at least one memory configured to store computer-executable instructions; and at least one processor configured to access the at least one memory and execute the computer-executable instructions. Further, these computer-executable instructions can be configured to receive alarm information or alarm events from one or more sensors, devices, or computing devices associated with a monitored system; generate at least one alarm event modality based at least in part on the received alarm information or alarm events; filter the received alarm information or alarm events using the at least one alarm event modality; and prioritize at least a portion of the filtered alarm information or alarm events.

According to yet another example embodiment, a system can be provided to reduce process alarms. The system can include at least one memory configured to store computer-executable instructions; and at least one processor configured to access the at least one memory and execute the computer-executable instructions. Further, these computer-executable instructions can be configured to receive alarm information or alarm events from one or more sensors, devices, or computing devices associated with a monitored system; generate at least one alarm event modality based at least in part on the received alarm information or alarm events; filter the received alarm information or alarm events using the at least one alarm event modality; prioritize at least a portion of the filtered alarm information or alarm events; assign at least one monitored system response to the at least one generated alarm event modality; implement the at least one monitored system response using a predetermined action; and output the at least one alarm event modality based at least on a portion of the filtered alarm information or alarm events.

Other embodiments, features, and aspects of the disclosure are described in detail herein and are considered a part of the claimed disclosure. Other embodiments, features, and aspects can be understood with reference to the following detailed description, accompanying drawings and claims.

BRIEF DESCRIPTION OF THE DRAWINGS

The detailed description is set forth with reference to the accompanying drawings, which are not necessarily drawn to scale.

DETAILED DESCRIPTION OF THE DISCLOSURE

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

The term "modality" or "modalities" as used herein means a grouping of alarm information exhibiting the same or similar attributes. In certain embodiments of the disclosure, a modality may not need an understanding of fundamental power plant processes to observe or identify a modality as such, but rather can be based on observing actions and interactions of certain automation system components with the physical process and detecting patterns and behaviors which allow one to conclude attributes of the alarms.

Certain embodiments of the disclosure can include systems and methods for process alarm reduction. Management of alarm events can be an exhaustive process due to the complexity of the system. In conventional alarm management techniques, determining the relative importance of an alarm event would require a judgment step to identify the issue and potential solution. Depending on the complexity of the system, the judgment step may require extensive analysis to mitigate an alarm event. One technical effect of certain embodiments of the disclosure can identify insignificant alarm events and/or nuisance alarms; compare the insignificant alarm events and/or nuisance alarms to historical data; and filter the insignificant alarm events and/or nuisance alarms during the analysis of a subsequent mitigating action. The identification, comparison, and filtering of insignificant alarm events and/or nuisance alarms can be automated in a set of algorithms and recognition modules that may not need human intervention. Another technical effect of certain embodiments of the disclosure may avoid the significant man-hour cost of performing the actual rationalization and prioritization of alarm event and/or nuisance alarm relevance.

Figure 1:
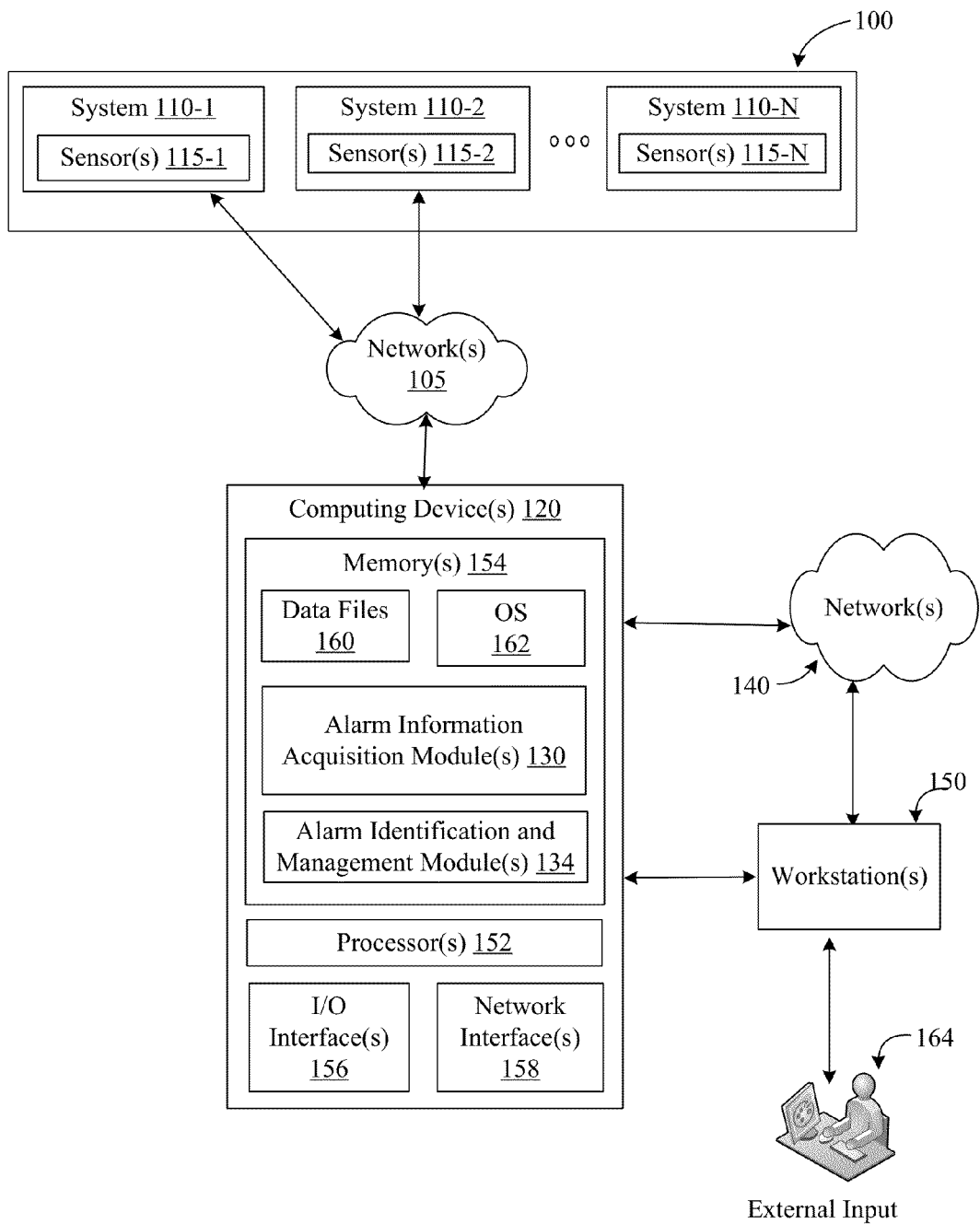
FIG. 1 is a block diagram of one example system that facilitates alarm filtering of monitored systems, according to an illustrative embodiment of the disclosure.

Referring to FIG. 1, the block diagram depicts one example system 100 that facilitates the monitoring of one or more subsystems according to an illustrative embodiment of the disclosure. The system 100 may include one or more subsystems 110-1 through 110-N (referred to as "subsystem(s) 110"), one or more sensors 115-1 through 115-N (referred to as sensor(s) 115"), and one or more computing devices 120 for which alarm management on a system-wide basis may be implemented. In certain embodiments, the computing device 120 may be used for monitoring and/or controlling one or more of the subsystems 110 in the system 100.

As shown in FIG. 1, each of the subsystems 110 may include one or more sensors 115 that may be used to, for instance, monitor a piece of equipment. As desired, the sensors 115 may be positioned or mounted onto the piece of equipment and configured to collect alarm information that includes system and subsystem data, which may be used to determine whether one or more alarm events or conditions are present. In operation, the sensors 115 may collect, at predefined intervals, alarm information, such as, temperature values or pressure measurements, and provide the alarm information to the computing device 120 using any number of suitable methods or techniques.

For example, collected alarm information may be communicated to the computing device 120 and/or intermediary devices in communication with the computing devices 120 via any number of suitable networks 105, such as a local area network, a wide area network, a Foundation Fieldbus network, a Bluetooth-enabled network, a Wi-Fi enabled network, a radio frequency network, and/or any other suitable network. As another example, direct communication links may be utilized to facilitate communication of alarm information from the sensors 115 to the computing device 120. Additionally, in certain embodiments, the alarm information may be communicated in real-time or near real-time as the alarm information or other data is collected. In other embodiments, the alarm information may be stored and either periodically communicated to the computing devices 120 or communicated in response to some other trigger.

As desired, the computing device 120 may be in communication with any number of workstations 150, or external control systems (e.g., a supervisory control and data acquisition ("SCADA") system, etc.) via one or more suitable networks 140, such as the Internet, a propriety communications networks, or another wide area network. The computing device 120 may include any number of suitable computer processing components that may, among other things, facilitate processing of alarm information to determine whether one or more potentially dangerous alarm events and/or other alarm situations are present. Suitable processing devices that may be incorporated into the computing device 120 include, but are not limited to, personal computers, server computers, application-specific circuits, microcomputing devices, minicomputers, other computing devices, and the like. As such, the computing device 120 may include any number of processors 152 that facilitate the execution of computer-readable instructions. By executing computer-readable instructions, the computing device 120 may include or form a special purpose computer or particular machine that facilitates the processing of alarm information to provide, for instance, protection for one or more pieces of equipment associated with each of the subsystems 110.

In addition to one or more processor(s) 152, the computing device 120 may include one or more memory devices 154, one or more input/output ("I/O") interfaces 156, and/or one or more communications and/or network interfaces 158. The one or more memory devices 154 or memories may include any suitable memory devices, for example, caches, read-only memory devices, random access memory devices, magnetic storage devices, etc. The one or more memory devices 154 may store the alarm information or other data, executable instructions, and/or various program modules utilized by the computing device 120; for example, data files 160, an operating system ("OS") 162, an alarm information acquisition module 130 and/or an alarm identification and management module 134. The data files 160 may include any suitable data that facilitates the operation of the computing device 120 including, but not limited to alarm information for each of the subsystems 110 collected and/or received from the sensors 115, operational data associated with any subsystem 110, information associated with identified alarm events, information associated with generated alarm messages and/or information associated with one or more classifying criteria for classifying one or more alarm messages and/or information associated with one or more control actions directed by the computing device 120.

The OS 162 may include computer-executable instructions and/or program modules that may facilitate the execution of other software programs and/or program modules by the processors 152, such as the alarm information acquisition module 130 and/or the alarm identification and management module 134. The alarm information acquisition module 130 may be a suitable software module configured to collect, extract and/or store live and/or historic alarm information associated with each of the subsystems 110. For instance, the alarm information acquisition module 130 may collect alarm information, such as measurement data, from the sensors 115 and send to the computing device 120 at one or more predefined intervals, where the alarm information may be aggregated and stored in the memory 154 for further processing as described below.

Thereafter, at predefined intervals or in response to some other trigger, the alarm identification and management module 134 may be executed to evaluate the alarm information in real-time or near-real time to determine whether any potentially dangerous alarm events or conditions of the subsystems 110 may potentially exist and/or is occurring. For instance, the alarm identification and management module 134 may be configured to evaluate the alarm information, such as measurement values, for the subsystems 110 and determine if the measurement values are below or above a predefined threshold. If so, the alarm identification and management module 134 may identify an alarm event. In another example, the alarm identification and management module 134 may be configured to make alarm event assessments by comparing live alarm information to historic alarm information. For instance, if measurement values in live alarm information are higher than measurement values in historic alarm information, then the alarm identification and management module 134 may identify an escalation of a particular alarm event.

In another embodiment, the alarm identification and management module 134 may evaluate patterns in received alarm information. A recognized pattern can be classified as or otherwise known as a modality, wherein a modality is a grouping of alarm information exhibiting the same attributes. For example, chattering is a characteristic modality, wherein an alarm event quickly and repeatedly transitions between setting the alarm threshold and clearing the alarm threshold. Fleeting is another characteristic modality, wherein the frequency between events is greater than a characteristic chattering modality, while the period between setting and clearing the alarm threshold is still relatively short. Another modality can be established when alarm events occur in close temporal proximity to a specific operator input or change in an equipment operating state. In other embodiments, modalities can also be defined based on, but not limited to, several factors including state definitions, interrelationships, relative timing, absolute timing, recurrence, system load, historical data, control actions, modalities, and any other process parameters available and/or derivable from the real-time data and historical data stored in the memory 154.

Once a modality is defined, it can be used as an optimization tool to determine if an alarm event can be classified as a nuisance alarm. Nuisance alarms are alarm events that meet the alarm threshold; however, their repetition and/or abundance encumber the alarm management system, and the events' relevance may not require a remedial action. Removing nuisance alarms from the alarm management process increases the efficiency and productivity of the alarm management process. Once a nuisance alarm has been identified, the alarm identification and management module 134 can be configured to prompt an external user 164 to provide input or implement an automatic remedy programmed into the module for the respective modality.

In one embodiment of the alarm identification and management module 134, it can also be configured to store alarm information and determine if its pattern exhibits the characteristics of another modality. For example, a particular set of alarm information may not be classified as a nuisance alarm event for a chattering modality, but the alarm information may be subsequently classified as alarm events for a fleeting modality. In another embodiment, the alarm identification and management module 134 can be configured to prioritize or eliminate, temporarily or permanently, the alarm event modalities for immediacy of response based on a predetermined set of criteria. The prioritization criteria can include, but not be limited to: subsystem, type of modality, duration of modality, and/or any combination of the definable criteria.

Upon identifying an alarm event, the alarm identification and management module 134 may be configured to generate alarm messages or visualizations for an alarm event and/or alarm event modality. The alarm message may include a description of the alarm event based upon the alarm information and/or other information associated with the subsystem 110. In some embodiments, the alarm identification and management module 134 may be configured to communicate all alarm messages to control supervisory personnel and/or systems. The alarm message may be stored in association with the alarm identification in the memory 154. For example, an email or short message system ("SMS") alert may be communicated to an operator or technician associated with operating one or more subsystems 110.

In another embodiment, the operator may provide inputs or receive system feedback from a workstation 150. The workstation 150 may be a suitable processor-driven device configured to facilitate interaction with a user directly or through a mobile device. As desired, a workstation 150 may have components similar to those described above for the computing device 120. While monitoring the operations of a system, an operator of the workstation 150 may decide to view all alarm messages that have been provided by the alarm identification and management module 134 and/or provide the messages and visualizations to the engineer. The visualizations may be produced for an engineer in order for the engineer to assess a system's status and/or make a decision on a mitigation strategy to implement. These visualizations can include, but are not limited to: charts, tables, graphs, or cluster diagrams which may define the relationship between an alarm event, a modality, a subsystem, or the entire system.

For an embodiment that may have an external input 164, the visualizations may be used as an analysis tool that may directly motivate a decision by an engineer. Further, the system may identify an alarm that potentially matches a modality. In another embodiment, the visualization can also show the engineer data to support the results and data to support possible mitigation response. The engineer can then efficiently apply his or her domain knowledge to implement alarm mitigation techniques that are safe and effective, wherein the empirical data collected by the system can confirm that certain logic would suppress the alarm. In other embodiments, an alarm event mitigation strategy may be automated through an algorithm in the alarm identification and management module 134, such that the visualization can then be used by the engineer to subsequently validate the automated mitigation strategy implemented by the alarm identification and management module 134.

The alarm identification and management module 134 can also be configured to associate and provide a predetermined system response to a modality. Once a user, such as the operator/engineer, has assessed the alarm messages and/or visualizations, he or she may have a range of choices to address the modality and mitigate the alarm causing an issue. For example, some mitigating options can include, but are not limited to: suppressing a specific alarm if it occurs within a certain period of a specific control action; combining a common modality in a higher order grouping of modalities; or removing an alarm event modality until its consistency has been established for a specified duration. In the case of a chattering modality, mitigating strategies can include, but are not limited to: altering the duration of the alarm settings; adjusting the tolerances of the alarm deadband; adding in a nuisance filter; powering down the respective equipment; and/or scheduling maintenance for the subsystem 110.

As desired, embodiments of the disclosure may include a system 100 with more or less than the components illustrated in FIG. 1. Additionally, certain components of the system 100 may be combined in various embodiments of the disclosure. The example system 100 shown in FIG. 1 is provided by way of example only. Numerous other operating environments, system architectures, and device configurations are possible. Additionally, while the system 100 is described in FIG. 1 with reference to alarm analysis of equipment/assets of a power plant, the system and methods described herein may be implemented to analyze and manage alarms for equipment/assets of any type of facility or industry, such as, but not limited to: aviation equipment, aircraft manufacturing plants, health management equipment, etc. Accordingly, embodiments of the present disclosure should not be construed as being limited to any particular operating environment, system architecture, or device configuration.

Figure 2:
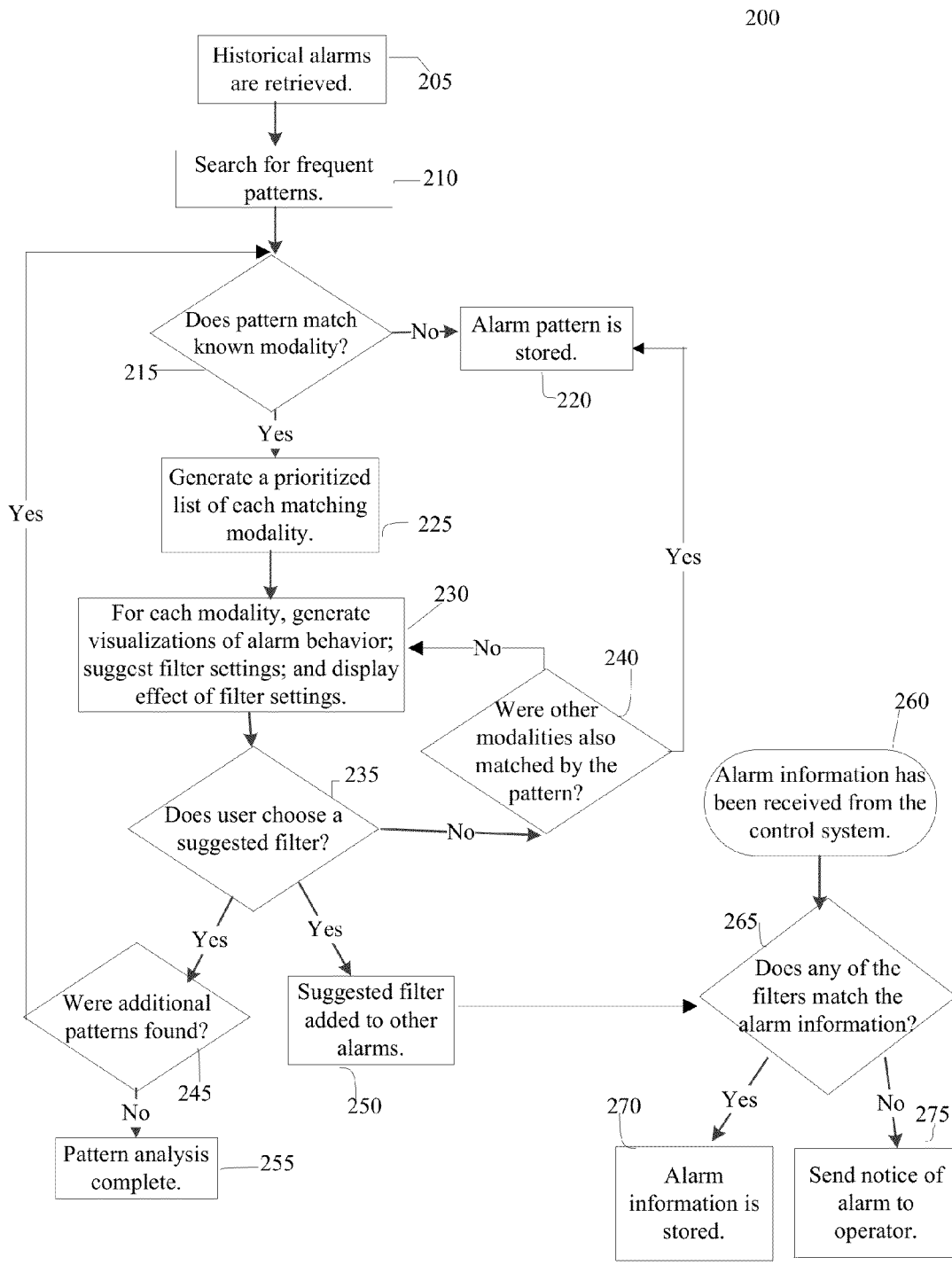
FIG. 2 is a flowchart illustrating an example method according to an example embodiment.

Referring now to FIG. 2, the flow diagram shows an example method 200 for reducing process alarms, according to an illustrative embodiment of the disclosure. The method 200 may be utilized in association with various systems, such as the system 100 illustrated in FIG. 1. In certain embodiments, the operations of the method 200 may be performed by a suitable computing device, such as the computing device 120 illustrated in FIG. 1.

FIG. 2 is a flowchart representing an example method for managing alarm events. The method 200 can begin in block 205, in which historic alarm information can be retrieved. For example, the processor 152 in FIG. 1 can retrieve historic alarm information from a memory, such as memory 154 in FIG. 1.

Block 205 can be followed by block 210, in which frequently occurring alarm patterns can be identified. For example, the processor 152 and/or at least one module 130, 134 can identify one or more frequently occurring alarm patterns based at least in part on the historic alarm information.

Block 210 can be followed by decision block 215, in which a determination can be made whether an alarm pattern matches a known modality. For example, the processor 152 can determine whether an identified alarm pattern matches a known modality. If determined that the alarm pattern does not match a known modality, the NO branch can be followed to block 220, wherein the alarm pattern can be stored. For example, if the processor 152 determines an identified alarm pattern does not match a known modality, the alarm pattern can be stored by the processor 152 in memory 154.

In block 215, if determined that the alarm pattern does match a known modality, the YES branch can be followed to block 225. In block 225, a prioritized list can be generated for each modality that the alarm pattern matches. For example, if the processor 152 determines an identified alarm pattern matches a known modality, the processor 152 and/or at least one module 130, 134 can generate a prioritized list for each modality the alarm pattern matches.

Block 225 can be followed by block 230, wherein, for each modality, one or more visualizations can be generated based on alarm behavior. Further, block 230 can also include generating one or more suggestions for filter settings and displaying the effects of the filter settings. For example, the processor 152 and/or at least one module 130, 134 can generate, for each modality, one or more visualizations of the alarm behavior. Furthermore, the processor 152 and/or at least one module 130, 134 can generate one or more suggestions for filter settings and display the effects of the filter settings.

Block 230 can be followed by decision block 235, in which a determination can be made whether a user will choose a suggested filter. For example, the processor 152 and/or at least one module 130, 134 can determine if a user chooses a particular or suggested filter. If determined that the user will not use a suggested filter, the NO branch can be followed to decision block 240.

In block 240, a decision can be made whether other modalities matched the alarm pattern. For example, the processor 152 and/or at least one module 130, 134 can determine whether other modalities match the alarm pattern. If determined that no other modalities match the alarm pattern, then the NO branch can be followed to block 220, wherein the alarm pattern can be stored. For example, if the processor 152 and/or at least one module 130, 134 determine no other modalities match the alarm pattern, the alarm pattern can be stored by the processor 152 and/or at least one module 130, 134 in memory, such as memory 154.

If determined that other modalities match the alarm pattern, the YES branch can be followed back to block 230, wherein visualizations can be generated based on alarm behavior. For example, if the processor 152 and/or at least one module 130, 134 can determine other modalities match the alarm pattern, then one or more visualizations can be generated based at least in part on the alarm behavior.

Referring back to block 235, if determined that the user will use a suggested filter, the YES branch can be followed to decision block 245. In block 245, a determination can be made whether additional alarm patterns can be recognized. For example, if the processor 152 and/or at least one module 130, 134 determines a user uses a particular or suggested filter, the processor 152 and/or at least one module 130, 134 can determine whether additional alarm patterns are recognized. If additional alarm patterns can be recognized, the YES branch can be followed to decision block 215, wherein a determination is made whether the alarm pattern matches a modality. For example, if the processor 152 and/or at least one module 130, 134 determines additional alarm patterns are recognized, the processor 152 and/or at least one module 130, 134 determines whether the alarm pattern matches a modality.

If additional alarm patterns cannot be recognized the NO branch can be followed to block 255, in which alarm pattern analysis can be concluded. For example, if the processor 152 and/or at least one module 130, 134 determines additional alarm patterns are not recognized, the processor 152 and/or at least one module 130, 134 can end the analysis process.

Referring again to block 235, if determined that the user will use a suggested filter, the YES branch can also be followed to block 250, wherein the suggested filter is added to other alarm filters. For example, if the processor 152 and/or at least one module 130, 134 determines that a user will use a particular or suggested filter, the processor 152 and/or at least one module 130, 134 can add the filter to the other alarm filters.

After the suggested filter has been added in block 250, the filter can be applied to new alarm information in decision block 265. For example, the processor 152 and/or at least one module 130, 134 can apply the filter to new alarm information. In block 260, new alarm information can be received. For example, the processor 152 and/or at least one module 130, 134 can receive new alarm information from the system, such as the system 100.

Block 260 can be followed by decision block 265, in which a determination can be made whether the suggested filter or the other filters match the alarm information. If determined that the alarm matches one of the filters, the YES branch can be followed to block 270, in which the alarm information can be stored. For example, if the processor 152 and/or at least one module 130, 134 determines the alarm matches one of the filters, the processor 152 and/or at least one module 130, 134 can store the alarm information in memory, such as memory 154.

If determined that the alarm does not match one of the filters, the NO branch can be followed to block 275, in which an alarm notice can be sent to a system operator. For example, if the processor 152 and/or at least one module 130, 134 determines the alarm does not match one of the filters, the processor 152 and/or at least one module 130, 134 can generate and transmit a notice or communication to a user, such as a system operator.

In other example embodiments of the disclosure, the method 200 can include fewer or greater numbers of operations than those described above, and may be performed in a different sequential order than described above.

Figure 3:
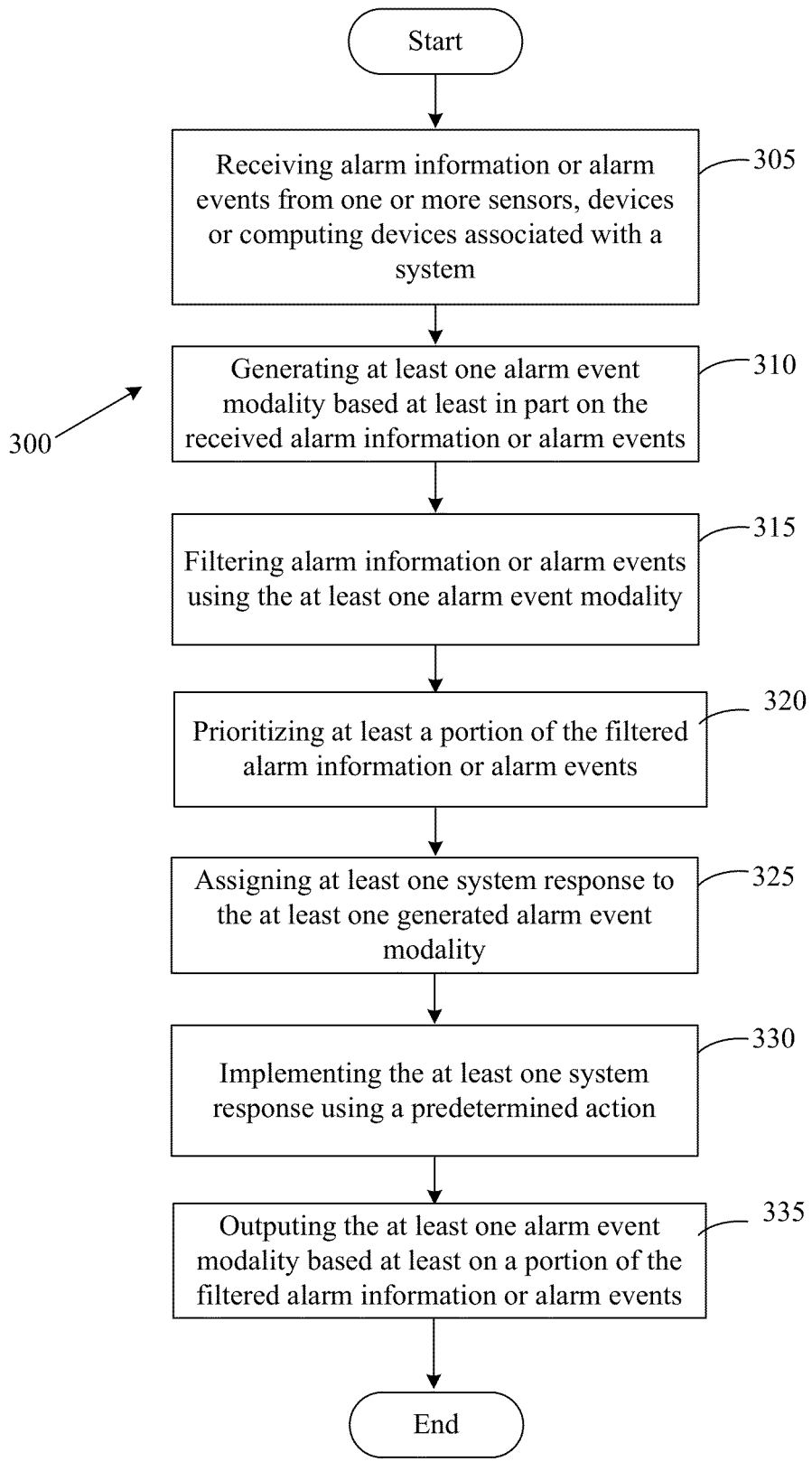
FIG. 3 is a flowchart illustrating another example method according to an example embodiment.

The operations described and shown in the method 300 of FIG. 3 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 3 may be performed. The method 300 can start in block 305, and according to an example embodiment of the disclosure, can include receiving alarm information or alarm events from one or more sensors, devices, or computing devices associated with a system.

In block 310, the method 300 can include generating at least one alarm event modality based at least in part on the received alarm information or alarm events. In block 315, the method 300 can include filtering the received alarm information or alarm events using the at least one alarm event modality. In block 320, the method 300 can include prioritizing at least a portion of the filtered alarm information or alarm events. In block 325, the method 300 can include assigning at least one alarm event response to the at least one generated alarm event modality. In block 330, the method 300 can include implementing the at least one alarm event response using a predetermined action. In block 335, the method 300 can also include outputting the at least one alarm event modality based at least on a portion of the filtered alarm information or alarm events.

In one embodiment, assigning at least one alarm event response to the least one generated alarm event filter can be initiated automatically by a computer processor or initiated using an external input. In another embodiment, the at least one generated alarm event modality can be based on at least one pattern in the received alarm information or alarm events. Further, the at least one pattern in the received alarm information or alarm events can be recognized by comparing received alarm information with an alarm event modality comprising at least a portion of historical data.

In another embodiment, the alarm information or alarm events can include at least one of (i) historic alarm information, (ii) historic alarm events, (iii) real-time alarm information, or (iv) responses to alarm events. In one embodiment, prioritizing at least a portion of the filtered alarm information or alarm events can be validated automatically or using an external input. In another embodiment, prioritizing at least a portion of the filtered alarm information or events can be implemented using predefined ranking criteria.

In other example embodiments of the disclosure, the method 300 can include fewer or greater numbers of operations than those described above, and may be performed in a different sequential order than described above.

The disclosure is described above with reference to block and flow diagrams of systems, methods, apparatus, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the disclosure has been described in connection with what is presently considered to be the most practical and various embodiments, it is to be understood that the disclosure is not to be limited to the disclosed embodiments, but on the contrary, is intended to cover various modifications and equivalent arrangements included within the spirit and scope of the appended claims.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed disclosure is:

1. A method for process alarm reduction comprising:
   receiving alarm information or alarm events from one or more sensors, devices, or computing devices associated with a monitored system, wherein the alarm events are based at least in part on one or more alarm settings;
   identifying one or more modality characteristics associated with nuisance alarms based on at least one pattern in the received alarm information or alarm events, wherein the one or more modality characteristics comprise at least: (i) a chattering characteristic or (ii) a fleeting characteristic;
   identifying a subset of alarm events that exhibit at least one of the one or more modality characteristics;
   generating at least one alarm event modality for the subset of alarm events;
   filtering the received alarm information or alarm events using the at least one alarm event modality;
   prioritizing at least a portion of the filtered alarm information or alarm events; and
   adjusting the one or more alarm settings based at least in part on the one or more modality characteristics and the at least one alarm event modality.

2. The method of claim 1 further comprising:
   assigning at least one monitored system response to the least one generated alarm event modality.

3. The method of claim 2, further comprising implementing the at least one monitored system response using a predetermined action.

4. The method of claim 2, wherein assigning at least one monitored system response to the at least one generated alarm event modality is initiated automatically by a computer processor or initiated using an external input.

5. The method of claim 1, wherein the at least one pattern in the received alarm information or alarm events is recognized by comparing the received alarm information with an alarm event modality comprising at least a portion of historical data.

6. The method of claim 1, wherein the alarm information or alarm events comprises at least one of (i) historic alarm information, (ii) historic alarm events, (iii) real-time alarm information or (iv) responses to alarm events.

7. The method of claim 1 further comprising:
outputting the at least one alarm event modality, based at least on a portion of the filtered alarm information or alarm events.

8. The method of claim 1, wherein prioritizing at least a portion of the filtered alarm information or alarm events is validated automatically or validated using an external input.

9. The method of claim 1, wherein prioritizing at least a portion of the filtered alarm information or alarm events is implemented using predefined ranking criteria.

10. A system for reducing system alarms comprising:
at least one memory configured to store computer-executable instructions; and
at least one processor configured to access the at least one memory and execute the computer-executable instructions to:
receive alarm information or alarm events from one or more sensors, devices, or computing devices associated with a monitored system, wherein the alarm events are based at least in part on one or more alarm settings;
identify one or more modality characteristics associated with nuisance alarms based on at least one pattern in the received alarm information or alarm events, wherein the one or more modality characteristics comprise at least: (i) a chattering characteristic or (ii) a fleeting characteristic;
identify a subset of alarm events that exhibit at least one of the one or more modality characteristics;
generate at least one alarm event modality for the subset of alarm events;
filter the received alarm information or alarm events using the at least one alarm event modality;
prioritize at least a portion of the filtered alarm information or alarm events; and
adjust the one or more alarm settings based at least in part on the one or more modality characteristics and the at least one alarm event modality.

11. The system of claim 10 further comprising:
assigning at least one monitored system response to the at least one generated alarm event modality.

12. The system of claim 11, further comprising implementing the at least one monitored system response using a predetermined action.

13. The system of claim 11, wherein assigning at least one monitored system response to the at least one generated alarm event modality is initiated automatically by a computer processor or initiated using an external input.

14. The system of claim 10, wherein the at least one pattern in the received alarm information or alarm event is recognized by comparing the received alarm information with an alarm event modality comprising at least a portion of historical data.

15. The system of claim 10 further comprising:
outputting the at least one alarm event modality based at least on a portion of the filtered alarm information or alarm events.

16. The system of claim 10, wherein prioritizing at least a portion of the filtered alarm information or alarm events is validated automatically or using an external input.

17. The system of claim 10, wherein prioritizing at least a portion of the filtered alarm information or alarm events is implemented using predefined ranking criteria.

18. A system for reducing system alarms comprising:
at least one memory configured to store computer-executable instructions; and
at least one processor configured to access the at least one memory and execute the computer-executable instructions to:
receive alarm information or alarm events from one or more sensors, devices or computing devices associated with a system, wherein the alarm events are based at least in part on the one or more alarm settings;
identify one or more modality characteristics associated with nuisance alarms based on at least one pattern in the received alarm information or alarm events, wherein the one or more modality characteristics comprise at least: (i) a chattering characteristic or (ii) a fleeting characteristic;
identify a subset of alarm events that exhibit at least one of the one or more modality characteristics;
generate at least one alarm event modality for the subset of alarm events;
filter the received alarm information or alarm events using the at least one alarm modality;
prioritize at least a portion of the filtered alarm information or alarm events;
assign at least one monitored system response to the at least one generated alarm event modality;
implement the at least one monitored system response using a predetermined action;
output the at least one alarm event modality based at least on a portion of the filtered alarm information or alarm events; and
adjust the one or more alarm settings based at least in part on the one or more modality characteristics and the at least one alarm event modality.

\* \* \* \* \*